United States Patent
Schroth et al.

(10) Patent No.: US 10,284,050 B2
(45) Date of Patent: May 7, 2019

(54) APPARATUS FOR AVOIDING HARMFUL BEARING CURRENTS

(71) Applicant: ebm-papst Mulfingen GmbH & Co. KG, Mulfingen (DE)

(72) Inventors: Sebastian Schroth, Kupferzell (DE); Roland Oberst, Gruensfeld (DE); Malte Pils, Ilshofen-Oberaspach (DE); Marco Weckert, Doerzbach-Hohebach (DE)

(73) Assignee: ebm-papst-Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 15/737,975

(22) PCT Filed: May 4, 2016

(86) PCT No.: PCT/EP2016/059990
§ 371 (c)(1),
(2) Date: Dec. 19, 2017

(87) PCT Pub. No.: WO2017/016692
PCT Pub. Date: Feb. 2, 2017

(65) Prior Publication Data
US 2018/0301953 A1    Oct. 18, 2018

(30) Foreign Application Priority Data
Jul. 24, 2015    (DE) .................. 10 2015 112 146

(51) Int. Cl.
*H02K 11/20* (2016.01)
*H02K 5/173* (2006.01)
(Continued)

(52) U.S. Cl.
CPC ........... *H02K 5/1732* (2013.01); *H02K 11/20* (2016.01); *H02K 11/40* (2016.01); *H02P 27/06* (2013.01)

(58) Field of Classification Search
CPC ...... H02K 5/1732; H02K 11/33; H02K 11/30; H02K 11/20; H02K 11/40
(Continued)

(56) References Cited

U.S. PATENT DOCUMENTS

2007/0182357 A1*  8/2007  Schrepfer .............. H02K 11/20
                                                                   318/632
2008/0088187 A1    4/2008  Shao et al.
(Continued)

FOREIGN PATENT DOCUMENTS

| DE | 10 2004 016738 B3 | 11/2005 |
| DE | 10 2006 007437 A1 | 8/2007 |
| EP | 1 445 850 A1 | 8/2004 |

OTHER PUBLICATIONS

International Search Report dated Aug. 10, 2016 which issued in PCT Patent Application No. PCT/EP2016/059990.
(Continued)

*Primary Examiner* — Michael Andrews
(74) *Attorney, Agent, or Firm* — Dickinson Wright PLLC

(57) ABSTRACT

The present invention relates to an apparatus for reducing and/or avoiding harmful bearing currents in an electrical machine (M) such as preferably a three-phase EC motor (M), with a rotor (2) and a stator (3) which is constructed in an insulated manner, wherein at least one outer bearing ring (4a) and one inner bearing ring (4b) are provided between rotor (2) and stator (3), comprising connecting electronics (10) for connecting the motor (M), wherein the stator (3) is connected by means of an electrical connection (20) to a high-frequency electronics potential (11) which differs from
(Continued)

Figure 1:
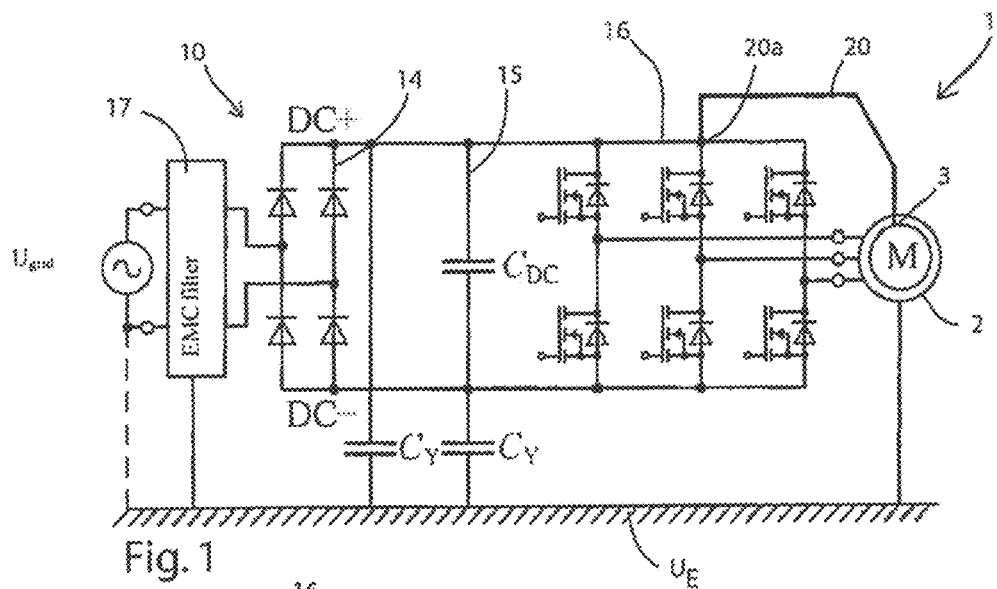

the earth potential ($U_E$) and is stable with respect to the latter at a potential tap (20a) of the connecting electronics (10).

9 Claims, 6 Drawing Sheets

(51) Int. Cl.
*H02P 27/06* (2006.01)
*H02K 11/40* (2016.01)

(58) Field of Classification Search
USPC .................. 310/40 R, 71, 72, 68 D, 68 R
See application file for complete search history.

(56) References Cited

U.S. PATENT DOCUMENTS

| | | | |
|---|---|---|---|
| 2011/0234026 A1* | 9/2011 | Mizukami | H02K 11/40 310/43 |
| 2016/0352187 A1* | 12/2016 | Wolf | H05K 9/0037 |
| 2018/0083514 A1* | 3/2018 | Xiao | H02K 11/022 |

OTHER PUBLICATIONS

Sebastian Schroth et al., "Impact of Stator Grounding in Low Power Single-Phase EC-Motors", 2014 IEEE Applied Power Electronics Conference and Exposition—APEC 2014, IEEE, Mar. 16, 2014 (Mar. 16, 2014), pp. 783-790.

* cited by examiner

APPARATUS FOR AVOIDING HARMFUL BEARING CURRENTS

The present invention relates to an apparatus for reducing and in particular for avoiding harmful bearing currents in an electrical machine such as an EC motor as well as to an electrical machine equipped with such an apparatus.

Variable speed motors are supplied today primarily by voltage source inverters. However, the supply through the voltage source inverter leads to bearing currents in the bearings of the motor.

Such a current flow through the bearing can lead to damage including total failure in electrical machines with rolling and sliding bearings. In grid operation, so-called ripple voltages can occur which are induced in a conductor loop which consists of the shaft, the two bearings, the end plates as well as the housing.

The background and physical causes of ripple voltages are described extensively in the literature. Expressed simply, due to asymmetries of the magnetic circuit, magnetic flows that do not add up to "zero" occur within the electrical machine, causing said annular magnetic flow.

For the generation of the required current form, an inverter circuit (inverter) is used, which by PWM on average applies a voltage to the terminals of the EC motor such that the desired current form is obtained. The inverter here works typically with a switching frequency outside of the audible range (>16 kHz).

If the supply of the electrical machine is generated from a pulse width modulated a second type of electrical bearing stress occurs, namely a capacitively coupled-in bearing voltage. Due to the switched pulse pattern of the inverter, a common mode voltage relative to the earth potential is obtained at its output, which undergoes large jumps with the switching frequency of the inverter. This common mode voltage is also transferred via capacitive coupling networks to the bearing. The physical cause of this type of bearing voltage consists of the voltage changes at the inverter output, which are generated by the rapid switching processes and by the control method of the pulse width modulated inverter which is in direct correlation with the common mode voltage.

As a result, a voltage is generated between the inner bearing ring and outer bearing ring and the ball of the bearing running on an insulating oil film, wherein the oil film between inner bearing ring and outer bearing ring can be considered to be a capacitor from the electrical standpoint. If, due to insufficient insulation strength of the oil film or excessive bearing voltages, a breakdown of the insulation then occurs, the oil film capacitance is discharged, and a compensation of the charge bearer between inner bearing ring and outer bearing ring (electric discharge machining) occurs.

Depending on the design of the motor, such bearing currents can lead to a premature failure of the bearing, which leads to a ripple formation on the running surfaces of the bearing and to decomposition of the bearing grease.

To remedy this, in the past, current-insulated bearings have been used, for example, bearings with a ceramic insulation on the outer ring or a hybrid layer with ceramic roller bodies. However, since these bearings are very expensive, such a solution is not ideally suited for mass production.

From the prior art, other remedies are known. Thus, the teaching of published documents EP 1 445 850 A1 or DE 10 2004 016 738 B3 is to use a device for protecting a bearing of an electrical machine, which provides a compensation circuit or a compensation device for generating a compensation current for the compensation of a parasitic current through the bearing.

An alternative solution is achieved by a targeted short circuit between the bearing rings. The teaching of US 20080088187A1, for example, is to provide a conductive connection between rotor and stator and to implement a short circuit between rotor and stator via a spring. Alternatives to this are also known, in which a bypass element (for example, bypass capacitor) between the bearings is used.

The disadvantages here include that the stator and rotor are connected in a conductive manner to one another. Thus, the required insulation between windings and the stator has to be correspondingly strengthened. Furthermore, wear phenomena occur on the sliding contact, and an additional bypass element also brings about additional costs.

Another known measure consists in insulating the shaft and overmolding the stator. Due to the additional insulation layer between the shaft and the stator, part of the bearing voltage is reduced by the insulation. Here, it is disadvantageous that the bearing voltages occurring can nevertheless be sufficiently high so that undesired bearing currents occur.

A solution such as impedance matching of the end plate, disclosed, for example, in US 2011/0234026 A1, is only suitable for designs in which conductive end plates are provided in the first place.

From the publication by S. Schroth, D. Bortis, J. W. Kolar "*Impact of Stator Grounding in Low Power Single-Phase ECMotors, Proceedings of the 29th Applied Power Electronics Conference and Exposition (APEC 2014), Texas, Houston, USA, Mar. 16-20, 2014*," a solution is known, in which the stator has an insulating design, and there is capacitive connection of the stator to the earth potential. Here, it is problematic that the connection of the stator to the earth potential has an effect on the filtering properties of the EMC filter and leads to a clear worsening of the EMC properties, since, at the same time, the impedance with respect to the earth is decreased. This results in a clearly increased filter volume. This means that, in each case, an adaptation to the motor has to occur individually, so that such a solution can also not be used universally.

Therefore, the underlying aim of the invention is to provide a solution by means of which the undesired bearing currents can be effectively reduced or prevented entirely, in which the above-mentioned disadvantages do not occur, and which are universally usable.

This aim is achieved by means of an apparatus for preventing harmful bearing currents in an electrical machine having the features of Claim 1 as well as by means of a motor having the features of Claim 9.

The basic idea of the invention is that the protection of the bearing against undesired bearing currents occurs by connecting the stator to a high-frequency potential, preferably the electronics potential, that is stable with respect to the earth potential wherein the connection occurs either directly as a short circuit connection or alternatively via a capacitance or an impedance, whereby, at the same time, the insulation extent required for protection against contact is ensured by the introduced impedance.

The electrical connection of the stator to a stable electronics potential via any desired impedance can accordingly be implemented in a resistive, inductive or capacitive manner or by an integration of entire grid topologies.

In order to enable motor operation with variable speed operation of a motor, the motors are supplied via inverters with corresponding high cycle frequency. A typical current rectifier with DC intermediate circuit (also referred to as voltage source inverter) usually consists of a rectifier, the intermediate circuit with constant voltage and an inverter, wherein a three-phase voltage system is generated from the constant intermediate circuit voltage. The intermediate circuit voltage is referenced to the earth potential via the rectifier and/or the EMC filter. Due to the pulsing, a voltage occurs between the earth potential and the motor phases, which corresponds to half the intermediate circuit voltage ($\pm U_{ZK}/2$). This voltage occurs in all three phases as in phase common mode voltage.

According to the invention, the above-mentioned stable potential of the electronics to which the stator is electrically connected is a potential of a preferably filtered voltage source inverter, which is different from the grounding potential. Thus the connection can be to the intermediate circuit potential DC+ of the intermediate circuit or the ground potential of the electronics or DC−, to the potential before or after the rectifier of the rectifier circuit, to the potential within the EMC filter, or alternatively also the output potential of the low-voltage power supply or of the switching power supply.

According to the invention, an apparatus for reducing and/or avoiding harmful bearing currents in an electrical machine is proposed, such as, for example, in a three-phase EC motor, with a rotor and a stator which is constructed in an insulated manner, wherein an outer bearing ring and an inner bearing ring are provided between rotor and stator, comprising moreover connecting electronics for connecting the motor, wherein the stator is connected by means of an electrical connection to a high-frequency electronics potential which differs from the earth potential and is stable with respect to said earth potential at a potential tap of the connecting electronics.

In a preferred embodiment of the invention, it is provided that the electrical connection between the stator and the electronics potential is formed via an intermediate capacitance or via any intermediate impedance.

Alternatively, it can be provided that the electrical connection between the stator and the electronics potential is formed as an electrical short circuit connection. Thus, during the operation of the motor, the stator is directly at the electronics potential.

In another advantageous design of the apparatus according to the invention, it is provided that the connecting electronics comprises at least one rectifier, an intermediate circuit and an inverter, and the potential tap for the connection of the stator is arranged in the connecting electronics, so that the electronics potential connected at the stator corresponds to one of the potentials mentioned below:
 the potential of the intermediate circuit, preferably the positive intermediate circuit potential (DC+)
 the ground potential of the intermediate circuit (15),
 the potential at the center tap (15') of the intermediate circuit (15) or
 the negative intermediate circuit potential (DC−).

Alternatively, the potential tap for connecting the stator to the electronics potential can also be a tap directly before or after the rectifier. In this case, in a development of the invention, it is provided that a network which reduces the impedance in the frequency range of the bearing voltage is connected in parallel to a diode, to several diodes or to all the diodes of the rectifier.

In another alternative design of the invention, the connecting electronics moreover comprises on the input side an EMC filter, and the potential tap for the stator is a tap within the EMC filter.

Moreover, it can be provided alternatively that, to the extent that the connecting electronics is connected to a low-voltage power supply or to a switching power supply, the potential tap for the stator is provided as a tap at the outputs of the low-voltage power supply or of the switching power supply.

Another aspect of the present invention relates to an electric motor, preferably to an EC motor, which is designed with an apparatus as described before.

Other advantageous developments of the invention are characterized in the dependent claims or represented in further detail below together with the description of the preferred design of the invention in reference to the figures.

Figure 2:
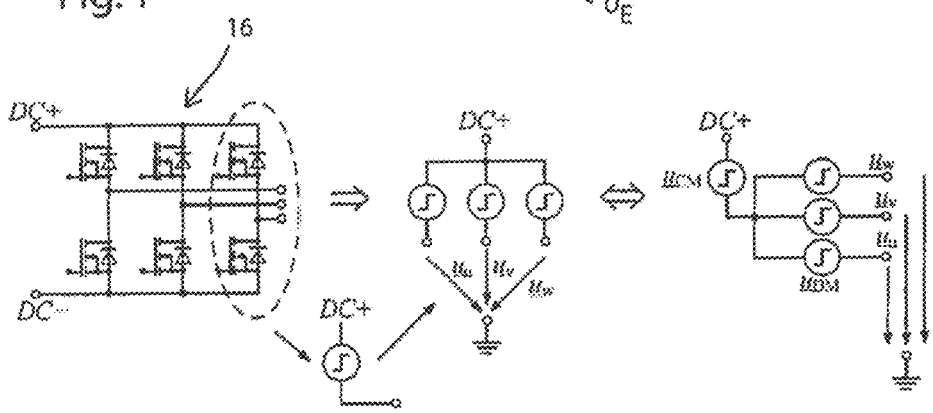
Figure 3:
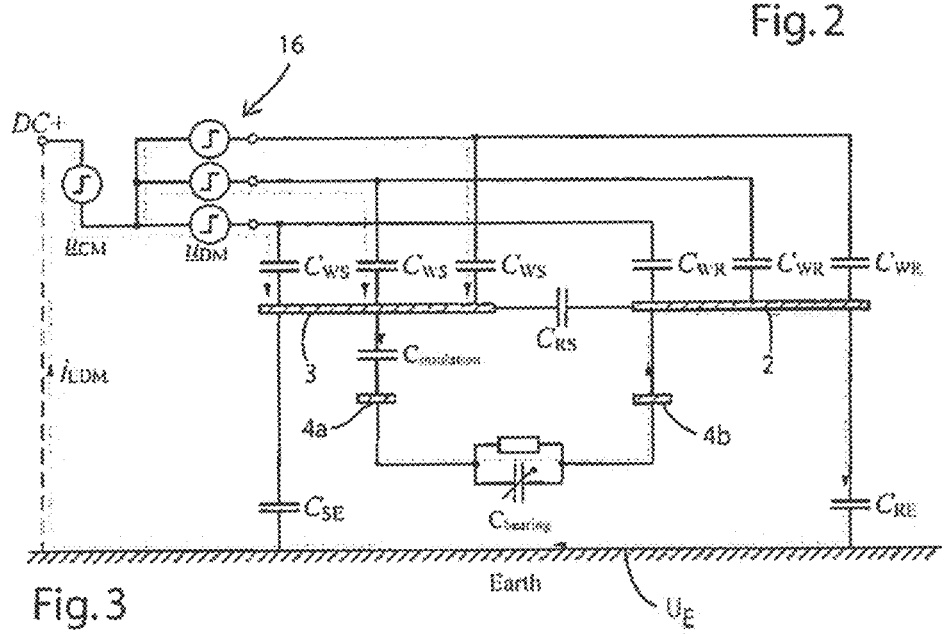
Figure 4:
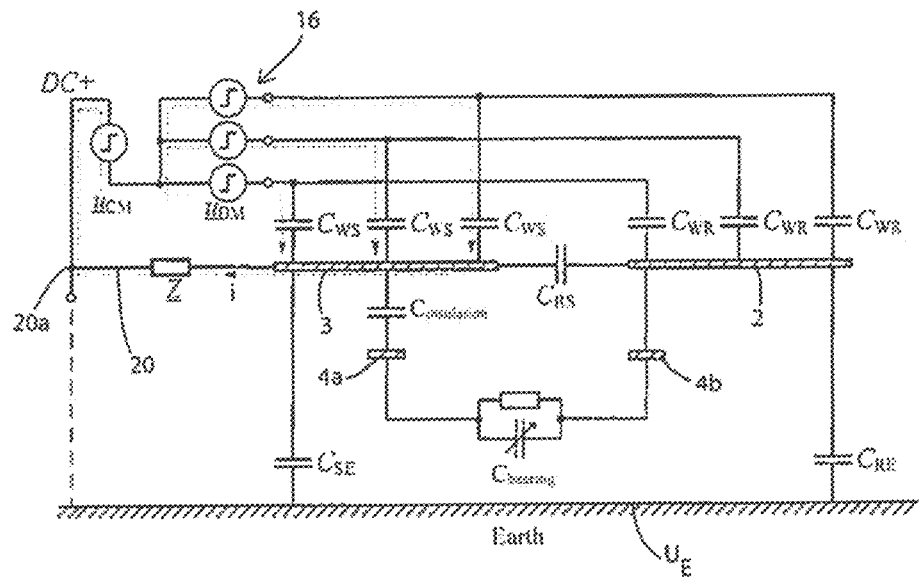
Figure 5:
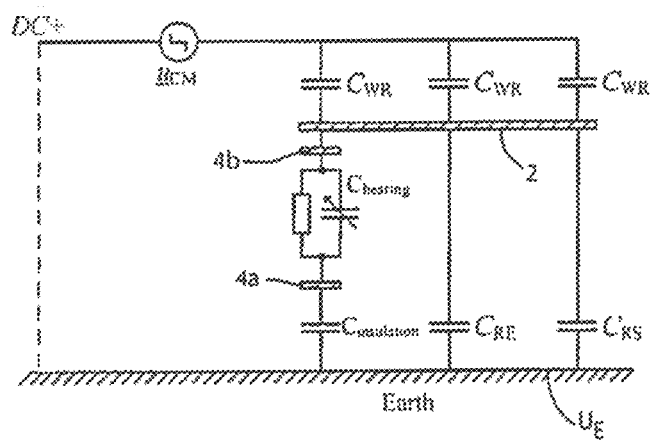
Figure 6:
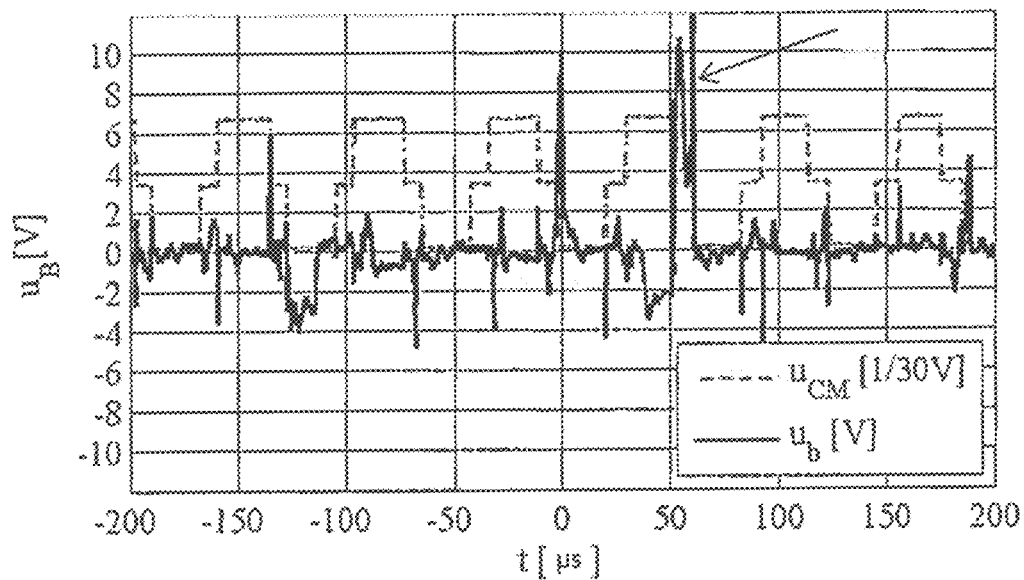
Figure 6:
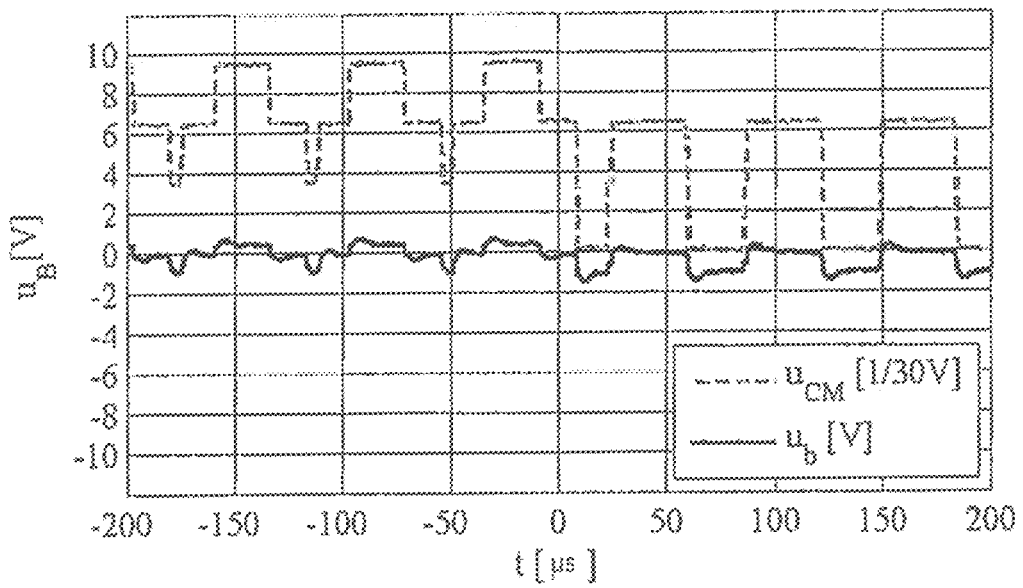
Figure 7:
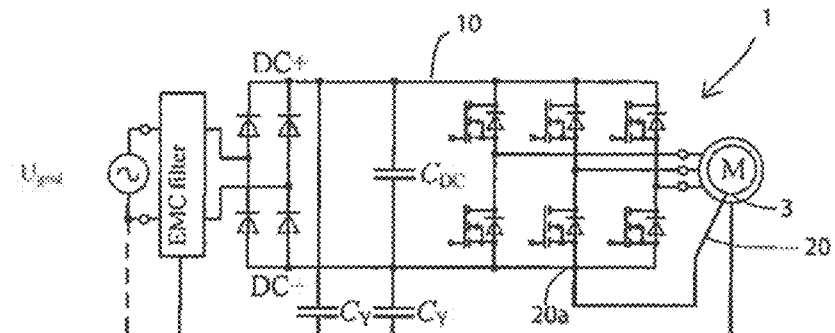
Figure 8:
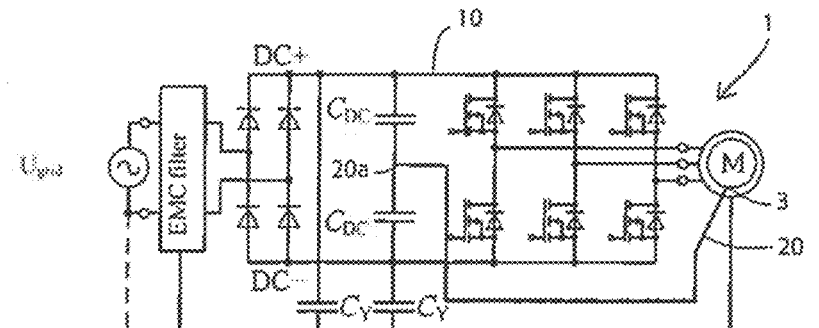
Figure 9:
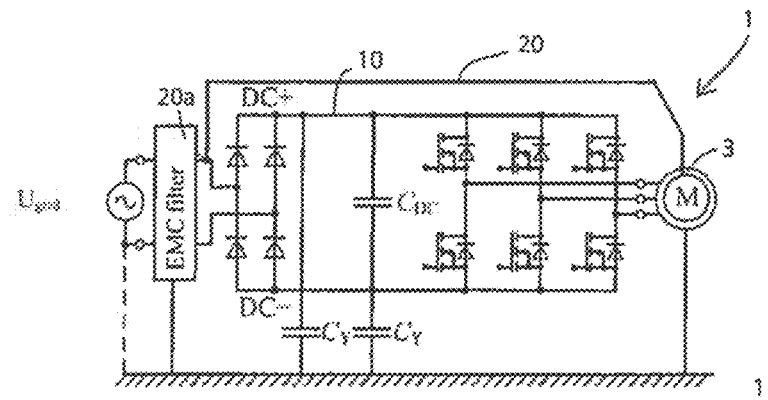
Figure 10:
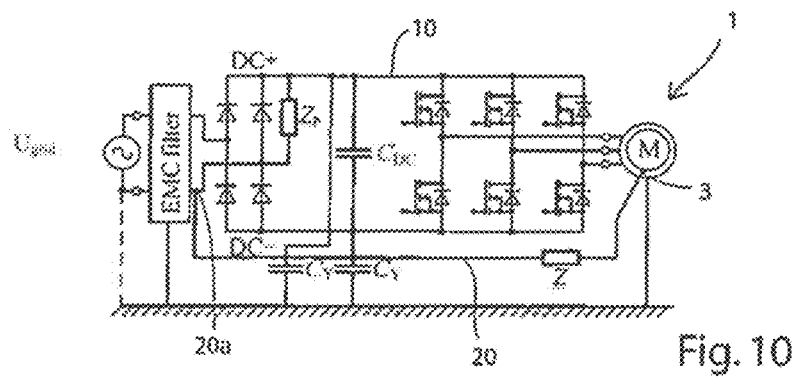
Figure 11:
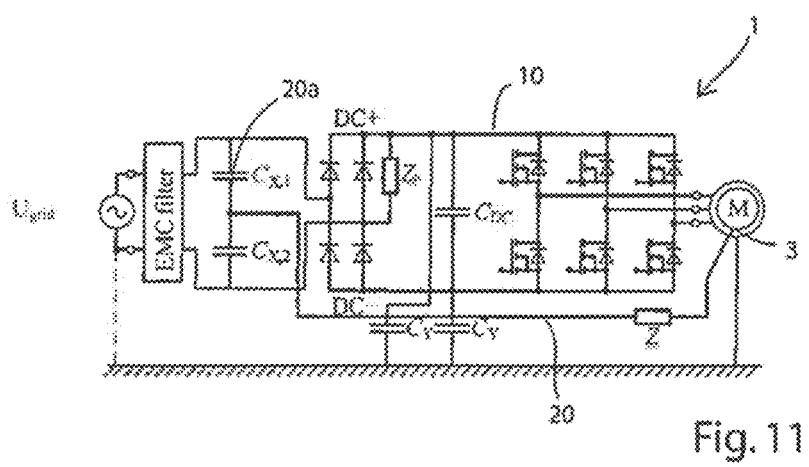
Figure 12:
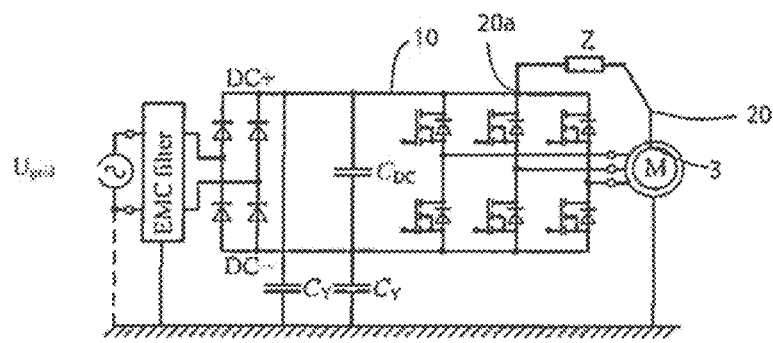
Figure 13:
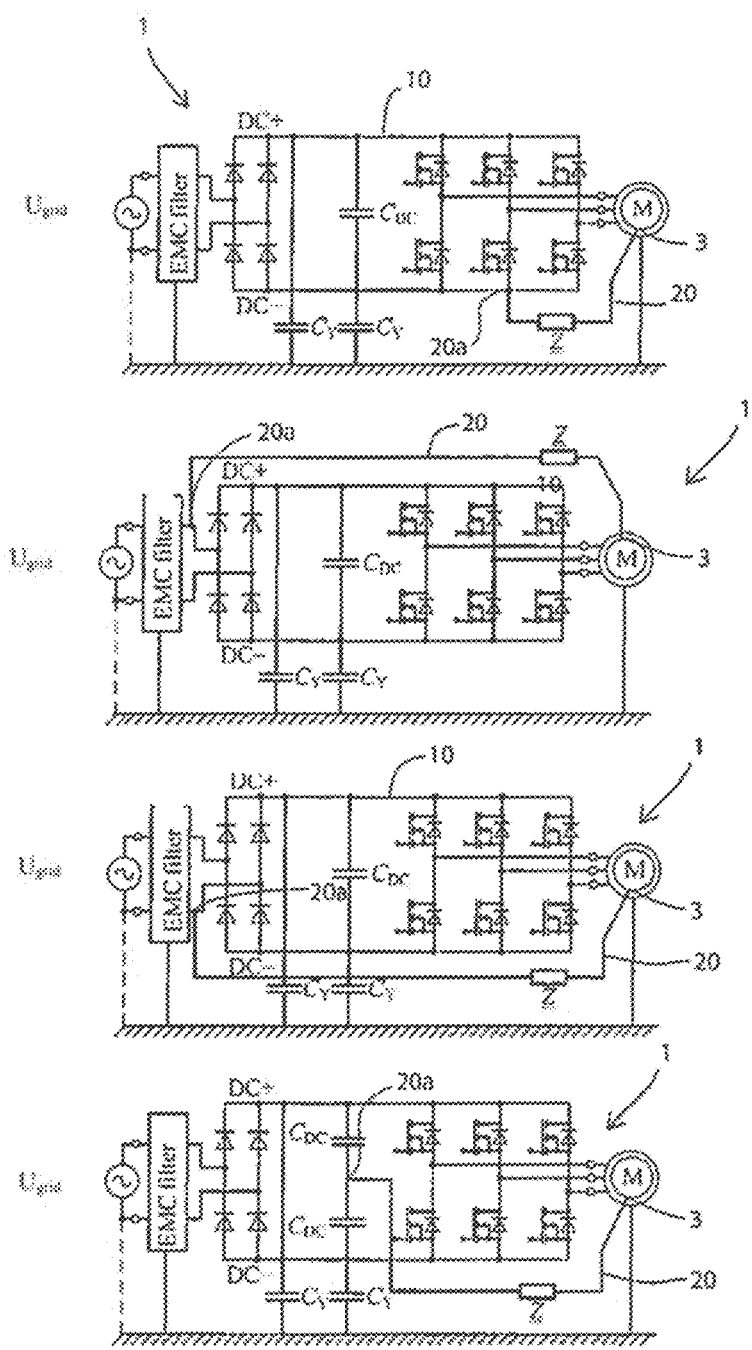

FIG. 1 shows a representation of the whole system in the case of a connection of the stator to the electronics potential, FIG. 2 shows a modeling of the capacitance network, FIG. 3 shows an equivalent circuit diagram of the parasitic bearing capacitances and the main current path of the bearing current, FIG. 4 shows an equivalent circuit diagram of the parasitic bearing capacitances in the connection of the stator with the consequently redirected earth current path, FIG. 5 shows a diagrammatically simplified equivalent circuit diagram for determining the bearing voltage according to the design of FIG. 3, FIG. 6 shows comparative measurement curves of the common mode voltage and of the bearing voltage (without and with connection of the stator), FIG. 7 shows an alternative embodiment of an apparatus according to the invention, FIG. 8 shows another alternative embodiment of an apparatus according to the invention in a second variant, FIG. 9 shows a second alternative embodiment of an apparatus according to the invention in the second variant, FIG. 10 shows a third alternative embodiment of an apparatus according to the invention in the second variant, FIG. 11 shows a fourth alternative embodiment of an apparatus according to the invention in the second variant, FIG. 12 shows another alternative embodiment in an apparatus according to the invention in a third variant, FIG. 13 shows other alternative embodiments of an apparatus according to the invention in the third variant.

The invention is described below based on preferred embodiment examples in reference to FIGS. 1 to 13, wherein the same reference numerals mark functionally and/or structurally identical features.

In FIG. 1, a representation of an embodiment example of a whole system is shown, in which an apparatus 1 for reducing and/or avoiding harmful bearing currents in the three-phase supplied EC motor M is represented. The motor M is designed with a rotor 2 and with a stator 3 which is constructed in an insulated manner, which, in the case at hand, are represented only diagrammatically.

The apparatus 1 comprises (as can be seen further in FIG. 1) connecting electronics 10 for connecting the motor M, with a rectifier 14, an intermediate circuit 15 and an inverter 16 as well as, on input side, with an EMC filter 17. As can also be seen in FIG. 1, the stator 3 is connected via a connection 20 to the potential tap 20*a* on the inverter 16.

To explain the operating mode of the apparatus according to the invention, below in FIG. 2, a modeling of the 3-phase inverter 16 as well as of the capacitive network of the parasitic capacitances is represented.

On the connection side, the intermediate circuit voltage DC+, DC− of the intermediate circuit 15 (as represented in FIG. 1) is in applied to the inverter 16. The voltages applied to the motor terminals are marked with $u_u$, $u_v$ and $u_w$, while the half bridges are represented using the simplified half-bridge symbol.

The voltage applied by the inverter 16 to the motor terminals is decomposed into a common mode portion ($u_{CM}$) and a differential mode portion ($u_{DM}$). The common mode portion is composed of the average of the voltage provided by the half-bridges of the inverter. The differential mode voltage is the difference between the voltage at the switch and the common mode voltage.

In FIG. 3, an equivalent circuit diagram of the parasitic bearing capacitances with the main current path of the bearing current through the bearing of the motor M is shown. The rotor 2 is rotatably mounted relative to the stator 3 via an outer bearing ring 4a (stator side) and an inner bearing ring 4b (rotor side).

In a simplified descriptive model, at least the following capacitances occur in the system, which are marked further in FIG. 3. Due to the small distance between the winding and the stator packet, a winding-stator capacitance $C_{WS}$ occurs in the system. Furthermore, due to the winding heads of the motor, a winding-rotor capacitance $C_{WR}$ is also generated in each case.

Between the rotor and the stator, the rotor-stator capacitance $C_{RS}$ is located, which is similar to the capacitance of a cylinder capacitance. Between the stator 3 and the earth, as well as between the rotor 2 and the earth, respective parasitic capacitances occur. The capacitive coupling of the iron yoke to the housing cover or the electronics results in the parasitic stator-earth capacitance $C_{SE}$, while the parasitic rotor-earth capacitance $C_{RE}$ is typically caused by extensions on the rotor (for example, metal impellers). The bearing capacitance between the outer bearing ring 4a and the inner bearing ring 4b is marked with $C_{bearing}$.

A change in the neutral point potential of the $C_{WS}/C_{WR}$ star circuit can be generated only by a change in the common mode voltage provided by the inverter 16.

Due to the symmetric star circuit of the capacitances from the winding to the rotor 2 and from the winding to the stator 3 ($C_{WS}$ and $C_{WR}$), the differential mode portion of the voltage, which is only on the windings, cannot cause any changes in the neutral point potential. Thus, no transmission of differential mode voltages into the remaining capacitances of the network occurs.

The formation of the common mode currents via the capacitive network moreover requires a closed current path. Said current path is produced by connecting the inverter 16 to the earth potential $U_E$ of the earth via the Y capacitors, EMC filters or the grid installation. The common mode currents thus formed flow from the inverter 16 to the capacitive network to earth and from there via the filter components and the grid back to the inverter 16 again.

Typically, the largest proportion here is comprised of the currents, marked $i_{EDM}$ in FIG. 3, via the stator 3, via the outer bearing ring or inner bearing ring, 4a and 4b, respectively, to the rotor 2 and then to earth (represented with a broken-line arrow line in FIG. 3).

Due to the different values of the capacitances ($C_{WS}$ clearly greater than the capacitance $C_{WR}$), the common mode currents therefore flow mainly via the capacitances $C_{WS}$, and in the case of such a circuit topology, therefore via the bearing rings 4a, 4b.

The larger the additional extensions on the rotor 2 are, the lower the rotor potential with respect to earth is, and the smaller the bearing voltages are. However, for the harmful bearing voltages, only voltage changes $\Delta U$ with respect to the earth potential $U_E$ are relevant.

In FIG. 4, the implementation of the invention is shown based on an equivalent circuit diagram of the parasitic bearing capacitances in the connection, i.e., in the connection of the stator 3 via an impedance Z to the potential tap 20a of the inverter 16. Here, in the operation of the motor M, the positive intermediate circuit potential DC+ is applied. As a result, it is ensured that the potential of the stator 3 is kept constant for high frequencies with respect to the earth potential $U_E$, and most of the currents i do not flow back via the bearing, i.e., the outer bearing ring 4a or the inner bearing ring 4b, but rather flow again directly to the intermediate circuit potential.

To the extent that the impedance of Z for the high-frequency bearing currents can be neglected and the connection 20 between the stator 3 and the potential tap 20a has short circuit characteristics, the potential of the stator 3 can also change maximally with the grid frequency and no longer with the frequency of the inverter 16. The (simplified) equivalent circuit diagram resulting in this way can be indicated as in FIG. 5.

Due to the different values of the capacitances ($C_{WS}$ clearly greater than the capacitance $C_{WR}$), the impedance of the entire section increases accordingly, and the bearing voltage decreases. The parasitic capacitance $C_{RE}$, which is now parallel to the bearing, reduces the bearing voltage further, whereby, by means of this device, a significant reduction of the bearing voltage can be achieved.

Due to the connection of the stator 3 to the positive intermediate circuit potential DC+, the amounts of the high-frequency currents that flow to earth is clearly decreased. This has the advantage that the volume of the EMC filter is not increased in the solution according to the invention.

In FIG. 6, comparative measurement curves of the common mode voltage and of the bearing voltage can be found. The upper image shows the case without connection of the stator 3, and the lower image shows the design according to the invention with the connection 20 between stator 3 and the positive intermediate circuit potential DC+.

In the upper image, the broken-line shows the pulsed common mode portion $U_{CM}$ and the solid line shows the bearing voltage $U_b$. In particular in the area at 50 µs, voltage breakdowns of the bearing voltage can be clearly seen.

In the lower image of FIG. 6, it can be seen that in a stator 3 which is constructed in an insulated manner, as a result of its connection to the electronics potential, the amplitudes of the bearing voltage $u_b$ applied to the bearing were significantly decreased and breakdowns of the bearing voltage on the bearing do not occur.

In FIGS. 7 to 13, alternative embodiments of the invention are represented according to two other main variants. The first variant (shown above) related to the connection of the stator 3 to a potential tap 20a of the intermediate circuit potential. In FIG. 7, a solution is shown in which the connection of the stator 3 was implemented not with the positive but with the negative intermediate circuit potential DC−. Since only common mode processes are crucial to the bearing voltage, in the case of connection of the intermediate circuit 14 to DC−, possibly occurring bearing currents can be closed via the intermediate circuit capacitor $C_{DC}$.

The intermediate circuit capacitor $C_{DC}$, on the other hand, has capacitances that are clearly higher than the parasitic capacitances of the motor and can be considered to be a short circuit, for the sake of simplicity. This results in a direct connection to the electronics ground, and the potential of the stator 3 can be kept constant for high frequencies with respect to the earth.

A second variant relates to any other suitable connection which is at the potential of the intermediate circuit as shown, for example, a potential tap 20*a* at the center tap of the intermediate circuit 15, as in FIG. 8.

A third variant relates to a suitable connection which is at a potential of the connecting electronics 10, which differs from the intermediate circuit potential, as shown, for example, in the two images of FIG. 9, in which the potential tap 20*a* occurs before the rectifier 14. When using a Y capacitor, for example, a connection on the AC side of the rectifier 14 can thus also occur. Such a configuration would correspond to an alternating connection of the stator 3 to the ground potential and the intermediate circuit potential, depending on the sign of the grid voltage currently applied to the rectifier 14. However, it should be taken into consideration here that there should be no common mode chokes or filter elements that strongly increase impedance between the intermediate circuit 15 and the potential tap 20*a*, in order not to prevent the technical effect of the present invention. In this connection, it should also be taken into consideration that the given conduction time of the rectifier 14 should be over the longest possible time interval within the grid half wave. This can be achieved, for example, by an active PFC circuit. In the case of a passive rectifier 14, on the other hand, it must be ensured that either the rectifier 14 has a sufficiently large diode capacitance or, alternatively, corresponding impedances are connected in parallel to the rectifier, which reduce the rectifier impedance for the high-frequency bearing voltage. A corresponding design is represented in FIG. 10.

Another aspect which should be taken into consideration in the various embodiments is the protection of the motor M against contact and thus the protection of persons against electrical shock, since, due to the connection 20 between the stator 3 and the electronics potential, the insulation extent is reduced compared to conventional designs, and, in particular, in a first approximation, it is reduced to the insulation extent between the bearing seat and the rotor 2.

One possibility for establishing the required contact protection consists in providing the connection of the stator 3 via impedances with sufficient protective insulation. For this purpose, Y capacitors can be used, for example. For the HF common mode voltage of the inverter 16, the Y capacitance nevertheless works as a short circuit and thus like a direct connection. This is the case in particular if the capacitance used has a clearly smaller impedance in the frequency range of the bearing voltage than the capacitive network.

In FIG. 13, other embodiments are represented, which show the connection 20 of the stator 3 via an impedance Z.

The design of the invention is not limited to the above-indicated preferred embodiment examples. Instead, many variants that use the represented solution even in designs of fundamentally different type are conceivable.

The invention claimed is:

1. An apparatus (1) for reducing and/or avoiding harmful bearing currents in an electrical machine (M) comprising a three-phase EC motor (M), with a rotor (2) and a stator (3) which is constructed in an insulated manner, wherein at least one outer bearing ring (4*a*) and one inner bearing ring (4*b*) are provided between rotor (2) and stator (3), comprising connecting electronics (10) for connecting the motor (M), wherein the stator (3) is connected by means of an electrical connection (20) to a high-frequency electronics potential (11) which differs from the earth potential ($U_E$) and is stable with respect to the latter at a potential tap (20*a*) of the connecting electronics (10);

characterized in that the connecting electronics (10) comprises a rectifier (14), an intermediate circuit (15) and an inverter (16), and the potential tap (20*a*) in the connecting electronics (10) is provided so that the electronics potential (11) connected to the stator (3) corresponds to a potential of the intermediate circuit (15), to the positive intermediate circuit potential (DC+), to a ground potential of the intermediate circuit (15), to a potential at the center tap (15') of the intermediate circuit (15) or to the negative intermediate circuit potential (DC−).

2. The apparatus (1) according to claim 1, characterized in that the electrical connection (20) between the stator (3) and the electronics potential (11) is formed by an intermediate capacitance (21) or via an intermediate impedance.

3. The apparatus (1) according to claim 1, characterized in that the electrical connection (20) between the stator (3) and the electronics potential ($U_E$) is formed as an electrical short circuit connection.

4. The apparatus (1) according to claim 1, characterized in that the potential tap (20*a*) for the stator (3) is a tap immediately before or immediately after the rectifier (14).

5. The apparatus (1) according to claim 1, characterized in that the connecting electronics (10) moreover comprises an EMC filter (17) on the input side, and the potential tap (20*a*) for the stator (3) is a tap within the EMC filter (17).

6. The apparatus (1) according to claim 1, characterized in that the connecting electronics (10) is connected to a low-voltage power supply or switching power supply, and the potential tap (20*a*) for the stator (3) is provided as a tap at the outputs of the low-voltage power source or of the switching power supply.

7. The apparatus (1) according to claim 1, characterized in that the rectifier (14) is an active or passive rectifier.

8. The apparatus (1) according to any one of claim 1, characterized in that a network which reduces impedance in the frequency range of the bearing voltage is connected in parallel to at least one of diodes (14*a*) of the rectifier (14).

9. An electric motor (M), preferably an EC motor, designed with an apparatus (1) according to claim 1.

\* \* \* \* \*